United States Patent [19]
Lee et al.

[11] Patent Number: 6,111,868
[45] Date of Patent: Aug. 29, 2000

[54] PARALLEL ACQUISITION SYSTEM USING REFERENCE MATCHED FILTER

[75] Inventors: Jae Hong Lee; Jin Young Kim, both of Taejeon, Rep. of Korea

[73] Assignee: Korea Telecommunication Authority, Seoul, Rep. of Korea

[21] Appl. No.: 08/902,288

[22] Filed: Jul. 29, 1997

[30] Foreign Application Priority Data

Jul. 31, 1996 [KR] Rep. of Korea ..................... 96-32084

[51] Int. Cl.[7] .............................. H04B 1/69; H04J 13/02
[52] U.S. Cl. ........................ 370/342; 370/479; 375/152; 375/367
[58] Field of Search ..................................... 375/206–209, 375/340, 341, 343, 345, 346, 349, 350, 367, 368, 142–144, 148, 150–153; 370/479, 342, 522, 524

[56] References Cited

U.S. PATENT DOCUMENTS

| | | | |
|---|---|---|---|
| 5,363,403 | 11/1994 | Schilling et al. | 370/441 |
| 5,517,518 | 5/1996 | Morson et al. | 375/152 |
| 5,553,062 | 9/1996 | Schilling et al. | 375/205 |
| 5,719,852 | 2/1998 | Schilling et al. | 370/342 |
| 5,781,584 | 7/1998 | Zhou et al. | 375/207 |
| 5,818,868 | 10/1998 | Gaudenzi et al. | 375/206 |
| 5,862,133 | 1/1999 | Schilling | 370/342 |
| 5,950,131 | 9/1999 | Vilmur | 370/332 |

*Primary Examiner*—Seema S. Rao
*Attorney, Agent, or Firm*—Jacobson, Price, Holman & Stern, PLLC

[57] ABSTRACT

A parallel acquisition system configured using a reference matched filter, thereby obtaining a superior acquisition performance and a high throughput as compared to conventional serial acquisition systems and conventional parallel acquisition systems including no reference matched filter. The parallel acquisition system includes a reference matched filter connected in parallel to a plurality of detection matched filters connected together in parallel. The reference matched filter serves to estimate a dispersion of interference components of reception signals respectively input at the detection matched filters. The parallel acquisition system can be applied to the receiver of a spread spectrum system for a packet radio data communication in a multiple access environment.

7 Claims, 6 Drawing Sheets

PARALLEL ACQUISITION SYSTEM USING REFERENCE MATCHED FILTER

BACKGROUND OF THE INVENTION

1. Field of the Invention

The present invention relates to a parallel acquisition system configured using a reference matched filter and applied to the receiver of a spread spectrum system for packet radio data communications in a multiple access environment.

2. Description of the Prior Art

In order to operate efficiently a direct-sequence spread spectrum system in a multiple access environment, it is essentially required to synchronize a pseudonoise sequence received in the receiver of the system with a pseudonoise sequence locally generated in the receiver.

The synchronization carried out in such a spread spectrum system mainly involves two steps; an acquisition and a tracking.

Figure 1:
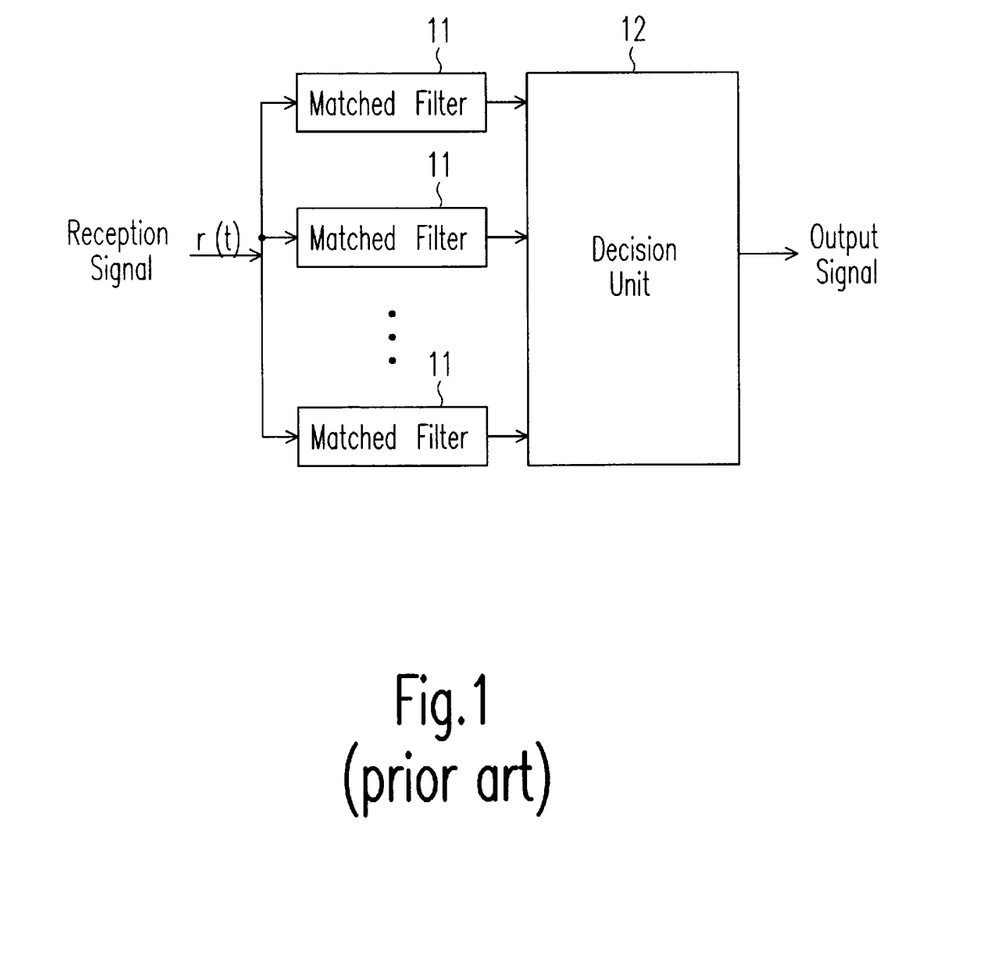
FIG. 1 is a block diagram illustrating a conventional parallel acquisition system using no reference matched filter.

FIG. 1 is a block diagram illustrating a conventional parallel acquisition system using no reference matched filter. In FIG. 1, the reference numeral 11 denotes a matched filter, and the reference numeral 12 denotes a decision unit.

As shown in FIG. 1, the conventional parallel acquisition system includes N matched filters 11 in order to process a reception signal received therein in a parallel manner. By virtue of such a parallel processing for a reception signal, the parallel acquisition system can reduce the average acquisition time, as compared to serial acquisition systems. The decision unit 12 determines whether or not the resultant signals obtained by the parallel processing have a higher value than a critical value. Based on the result of the determination, the decision unit 12 executes a coincidence detection mode.

Although the above-mentioned parallel acquisition system having no reference matched filter reduces the average acquisition time as compared to serial acquisition systems, it still has a problem in that the throughput of the entire system is degraded.

Figure 2:
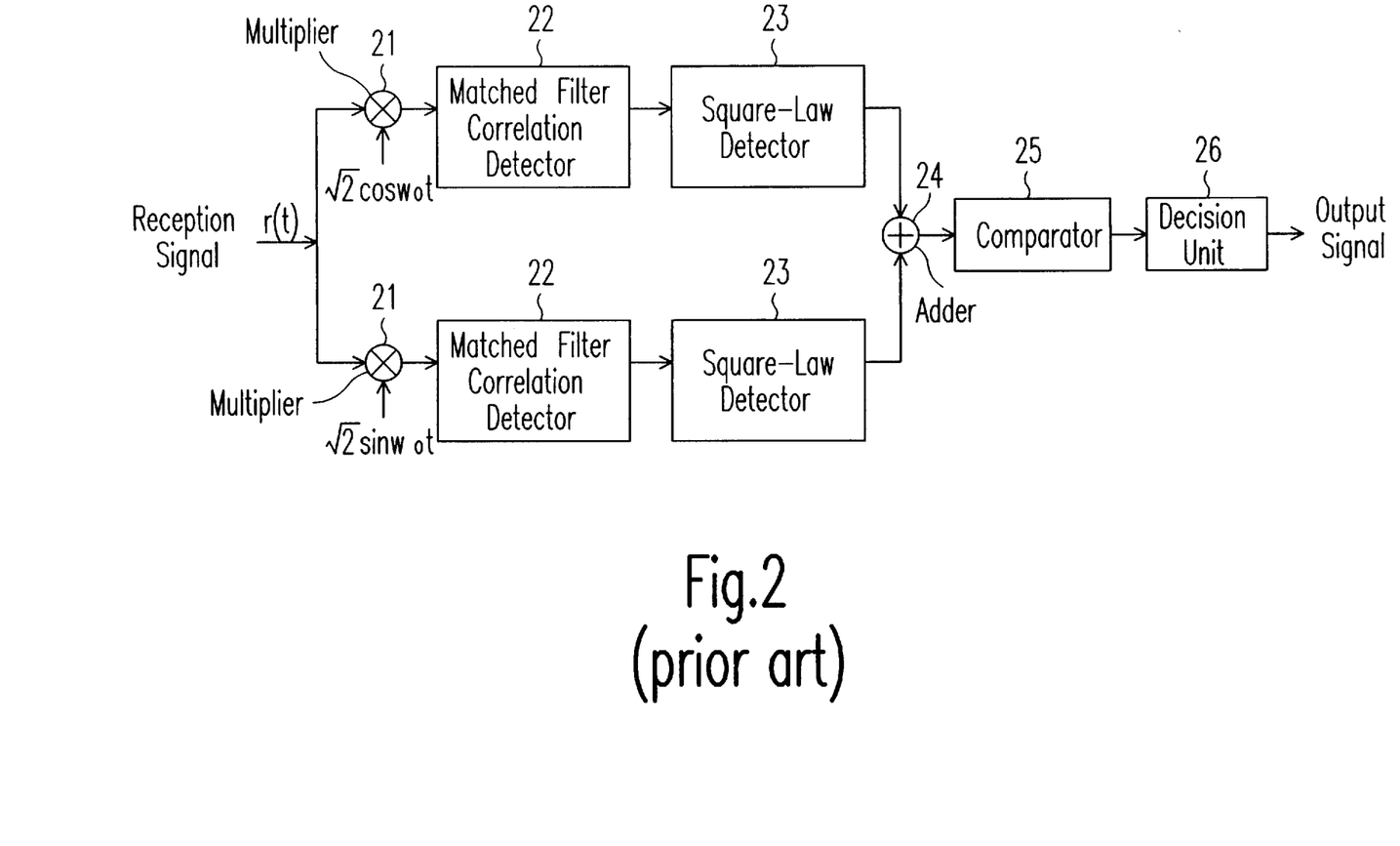
FIG. 2 is a block diagram illustrating a conventional serial acquisition system.

On the other hand, FIG. 2 is a block diagram illustrating a conventional serial acquisition system. In FIG. 2, the reference numeral 21 denotes multipliers, 22 matched filter correlation detectors, 23 square-law detectors, 24 an adder, 25 a comparator, and 26 a decision unit.

Figure 3:
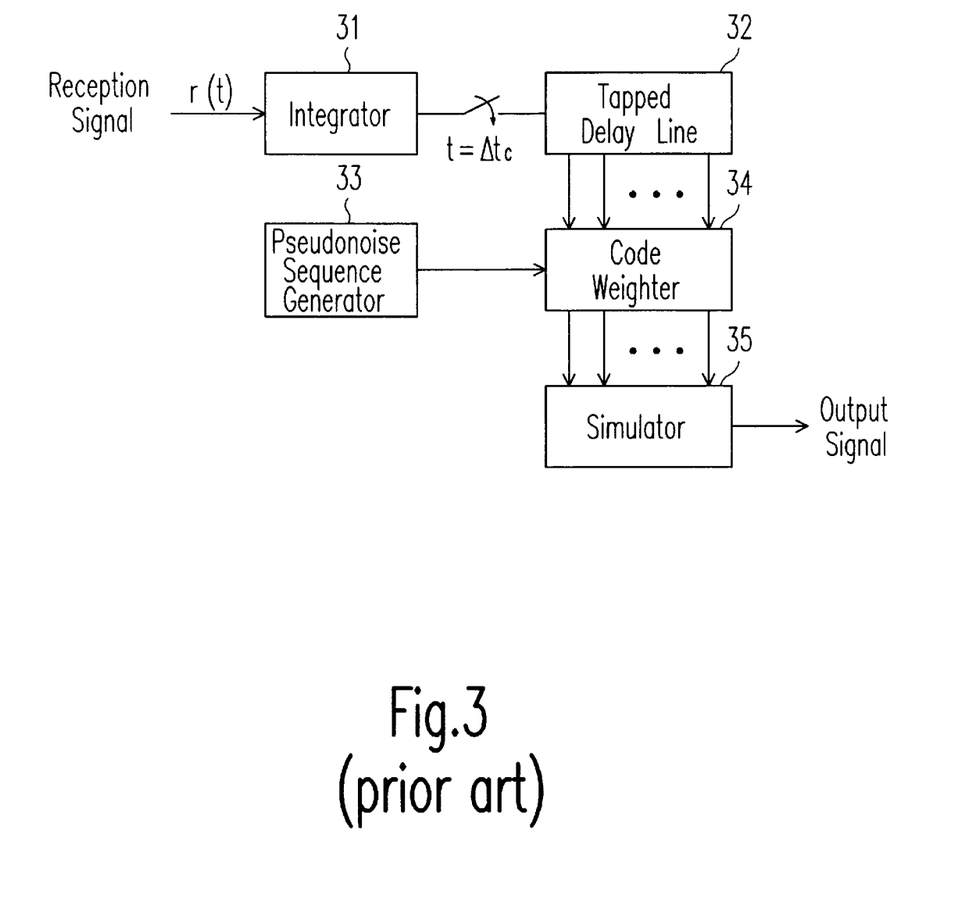
FIG. 3 is a block diagram illustrating a conventional matched filter correlation detector.

When a reception signal is received in the serial acquisition system, it is splitted into its in-phase component and its quadrature component which, in turn, pass through the adders 21. An output from each adder 21 is sent to an associated one of the matched filter correlation detectors 22 which, in turn, multiplies the reception signal by a pseudonoise sequence, thereby calculating correlations of those values. That is, each matching filter correlation detector 22 outputs a value of 1 when the correlations of the input values are the same while outputting a value of 0 when the correlations of the input values are different. Each matched filter correlation detector 22 has a configuration shown in FIG. 3. In the configuration shown in FIG. 3, a reception signal passes through an integrator 31 which, in turn, sends its output to a code weighter 34 via a tapped delay line 32. The code weighter 34 also receives an output from a pseudonoise sequence generator 33 and calculates a code weight based on the reception signal. The code weighter 34 then adds the calculated code weight to the signal received from the tapped delay line 32. Thus, the code weight 34 outputs the resultant signal as an output of the matched filter correlation detector.

Output signals from the matched filter correlation detectors 22 are sent to the associated square-law detectors 23 and then added to each other in the adder 24. An output signal from the adder 24 is compared with a detection critical value in the comparator 25. When the output signal from the adder 24 is lower than the detection critical value, the above procedure is executed again from the step of inputting a reception signal. When the output signal from the adder 24 is not lower than the detection critical value, the decision unit 26 executes a coincidence detection mode operation.

However, the above-mentioned serial acquisition system requires a lengthened average acquisition time, thereby increasing an initial communication disable time. As a result, performance degradation occurs. That is, the conventional serial acquisition system using matched filters obtains a low throughput in a multiple access environment.

SUMMARY OF THE INVENTION

An object of the invention is to solve the above-mentioned problems encountered in the prior art and provide a parallel acquisition system which includes a reference matched filter, thereby obtaining a superior acquisition performance and a high throughput as compared to conventional serial acquisition systems and conventional parallel acquisition systems including no reference matched filter.

In order to accomplish this object, the present invention provides a parallel acquisition system comprising: a plurality of detection matched filter means connected together in parallel and adapted to receive a sequence identical to a transmitted pseudonoise sequence as a reception signal, the detection matched filter means selectively outputting a maximum value of reception signals; reference matched filter means connected in parallel to the detection matched filter means and adapted to receive a sequence orthogonal to the transmitted pseudonoise sequence as a reception signal, the reference matched filter means filtering the received sequence, thereby removing a multiple access interference; gain multiplying means adapted to calculate a gain factor and to multiply the calculated gain factor by an output from the reference matched filter means, the gain multiplying means outputting the result of the multiplication as a decision critical value; comparing means adapted to compare an output from the detection matched filter means with the decision critical value output from the gain multiplying means and to generate an output only when the output from the detection matched filter means is higher than the decision critical value; and decision means adapted to receive the output from the comparing means, thereby executing a coincidence detection mode operation for eliminating an unnecessary false alarm.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 4:
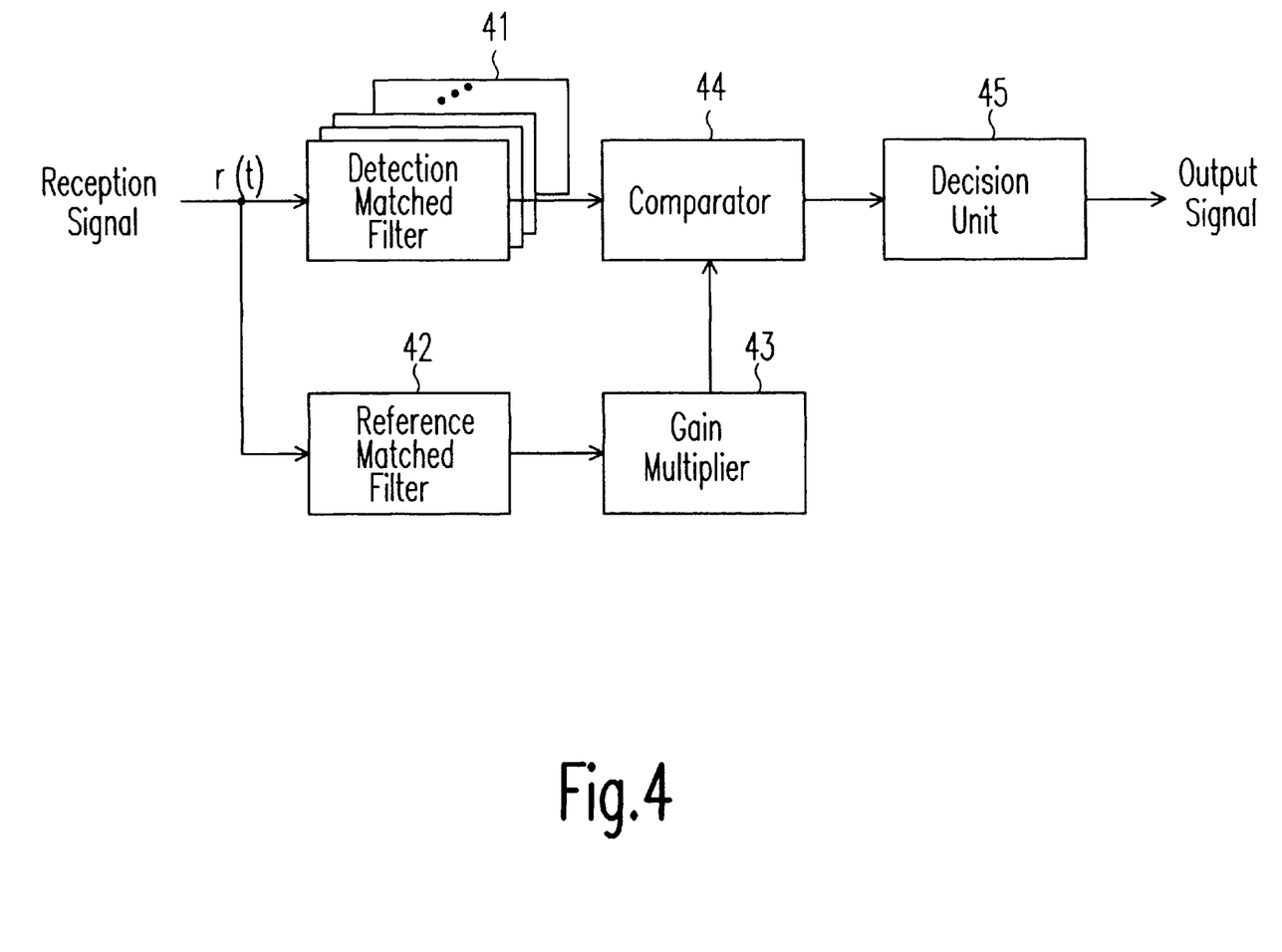
FIG. 4 is a block diagram illustrating the configuration of a parallel acquisition system using a reference matched filter in accordance with the present invention.

FIG. 4 illustrates the configuration of a parallel acquisition system using a reference matched filter in accordance with the present invention.

In FIG. 4, the reference numeral 41 denotes detection matched filters, 42 a reference matched filter, 43 a gain multiplier, 44 a comparator, and 45 a decision unit.

The parallel acquisition system according to the present invention operates in two modes, namely, a search mode and a coincidence detection mode. As shown in FIG. 4, the parallel acquisition system includes N detection matched filters 41 connected together in parallel, and a reference matched filter 42.

Each detection matched filter 41 receives a sequence identical to a transmitted pseudonoise sequence as a reception signal. Among the reception signals received in the detection matched filters 41, a maximum value one is selected and sent to the comparator 44.

The reference matched filter 42 receives a sequence orthogonal to the transmitted pseudonoise sequence and filters the sequence, thereby removing a multiple access interference. That is, the reference matched filter 42 is adapted to estimate a dispersion of interference components of reception signals input at the detection matched filters 41.

The gain multiplier 43 calculates a gain factor and multiplies the calculated gain factor by an output from the reference matched filter 42. The result of the multiplication is output from the gain multiplier 43 as a decision critical value.

The comparator 44 compares an output from each detection matched filter 41 with the decision critical value output from the gain multiplier 43. When the output from the detection matched filter 41 is lower than the decision critical value, the above procedure is executed again from the step of inputting a reception signal. When the output signal from the detection method filter 41 is not lower than the decision critical value, the decision unit 45 executes a coincidence detection mode operation. By the coincidence detection mode operation, an unnecessary false alarm is eliminated. When the outputs from the N parallel detection matched filters 41 are higher than the product of the output from the reference matched filter 42 by the gain factor, the system proceeds to the coincidence detection mode.

Figure 5:
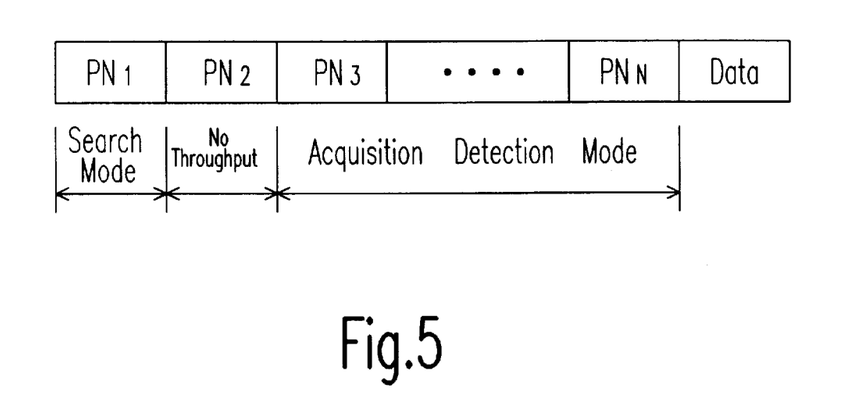
FIG. 5 is a view illustrating the format of a packet.

FIG. 5 is a view illustrating the format of a packet.

In a spread spectrum packet radio communication system, the preamble uses a finite number of short pseudonoise sequences in order to achieve a rapid acquisition. The preamble includes N pseudonoise sequences provided by M chips. The first pseudonoise sequence is used for a search mode. The second pseudonoise sequence is not processed in order to provide a spare time for an adjustment of the phase of a local pseudonoise sequence for the receiver of the spread spectrum packet radio communication system. On the other hand, the remaining N−2 pseudonoise sequence are used for a coincidence detection mode. Where among N−2 coincidence detection tests, there are N' tests in which the output from the detection matched filter 41 is higher than the critical value, it is determined that the coincidence detection has been successfully made.

Figure 6:
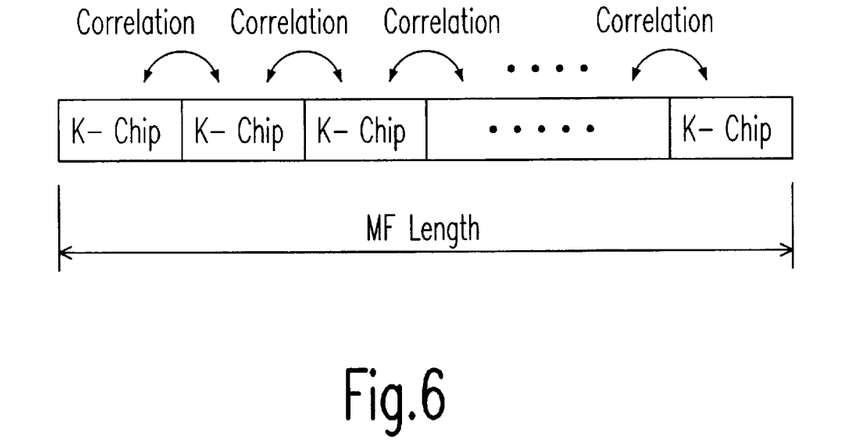
FIG. 6 is a view illustrating a fading process.

FIG. 6 is a view illustrating a fading process.

It is assumed that the fading process, which is carried out on a Rayleigh fading channel, is constant for k chips, and there is a correlation among k chip groups.

The following assumption is made to derive the throughput of the system according to the present invention:

1) All packets reaching the receiver are received at the same electric power level;
2) A code uncertainty region has a length corresponding to the entire code length consisting of MN chips;
3) The receiver is not blocked by a previous false coincidence detection;
4) An initial preamble bit is always detected; and
5) A coincidence for the acquisition decision is executed at the end of the preamble.

In an additive white Gaussian noise environment, a reception signal is given as follows:

$$r(t) = \sum_{k=1}^{K} (t) + N_{g(t)} \quad \text{[Equation 1]}$$

where, the first term represents a spread spectrum signal component, and the second term represents a noise and multiple access interference component.

When multiple access interference noise is modeled using a Gaussian probability variable, the effect of a dispersion thereof is exhibited as the result of the sum of dispersed interference components.

In a search mode using $MN/\Delta$ independent samples, an approximate false alarm probability is defined as follows:

$$P_F = 1 - (1 - P_{fa})^{NM/\Delta} = \exp(-\beta t'_1/2) \frac{MN}{\Delta} \text{ for } P_{fa} \ll 1 \quad \text{[Equation 2]}$$

where, "$P_{fa} = \exp(-\beta t'_1/2)$" represents a constant false alarm probability, "$f_1$" represents a critical value for the search mode standardized by the sum of dispersed noise and multiple access interference components, and "$\beta$" represents a gain factor.

The detection probability of the search mode is defined as follows:

$$P_D = \sum_{n=0}^{2MN-1} \frac{-1^n}{n+1} \binom{2MN-1}{n} \quad \text{[Equation 3]}$$

$$\exp\left(-nM\frac{r_i}{n+1}\right) Q\left(\sqrt{2M\frac{r_i}{n+1}} \cdot \sqrt{(n+1)\beta t'1}\right)$$

where, "$r_i$" represents an input signal-to-noise ratio, and $$"Q\left(\sqrt{2M\frac{r_i}{n+1}} \cdot \sqrt{(n+1)\beta t'1}\right)"$$

is a Marcum's Q function.

A successful coincidence probability is defined as follows:

$$P_{CD} = \sum_{k=N}^{N-2}\binom{N-2}{k}P_C^k(1-P_C)^{N-2-t} \quad \text{[Equation 4]}$$

where, $$"P_c = Q(\sqrt{2r_0}, \sqrt{\beta t'_2})"$$

represents a successful coincidence detection probability in every test, "$r_0=Mr_i$" represents an output signal-to-noise ratio in the detection matched filter, and "$f_2$" represents a critical value for the coincidence detection mode standardized by the sum of dispersed noise and multiple access interference components.

The false coincidence probability is defined as follows:

$$P_{FCD} = \sum_{k=N}^{N-2}\binom{N-2}{k}P_{FC}^k(1-P_{FC})^{N-2-k} \quad \text{[Equation 5]}$$

where, the false coincidence detection probability $P_{FC}$ in every test is "$\exp(-\beta t'_2/2)$" ($P_{FC}=\exp(-\beta t'_2/2)$).

An average blocking time resulting from a false acquisition decision is given as follows:

$$T_B=(N-1+L_d P_{FCD})T \quad \text{[Equation 6]}$$

where, "$L_d$" represents the number of data bits in a packet, and "T" represents a data bit succession time.

A receiver blocking probability is defined as follows:

$$P_B = \frac{BP_F T_B}{T_S} = \frac{(N-1+L_d P_{FCD})P_{fo}MN/\Delta}{1+(N-1L_d P_{FCD})P_{fa}MN/\Delta} \quad \text{[Equation 7]}$$

where, "$B=T_S/(T+P_F T_B)$" represents an average number of acquisitions between two successive packets, and "$T_S$" represents an average interval between two successive packets.

A packet throughput is given as follows:

$$\rho=(1-P_B)P_D P_{CD} \quad \text{[Equation 8]}$$

Accordingly, the packet throughput in the Rayleigh fading channel can be derived by Equation 8 using the same process as used for the additive white Gaussian noise.

Figure 7:
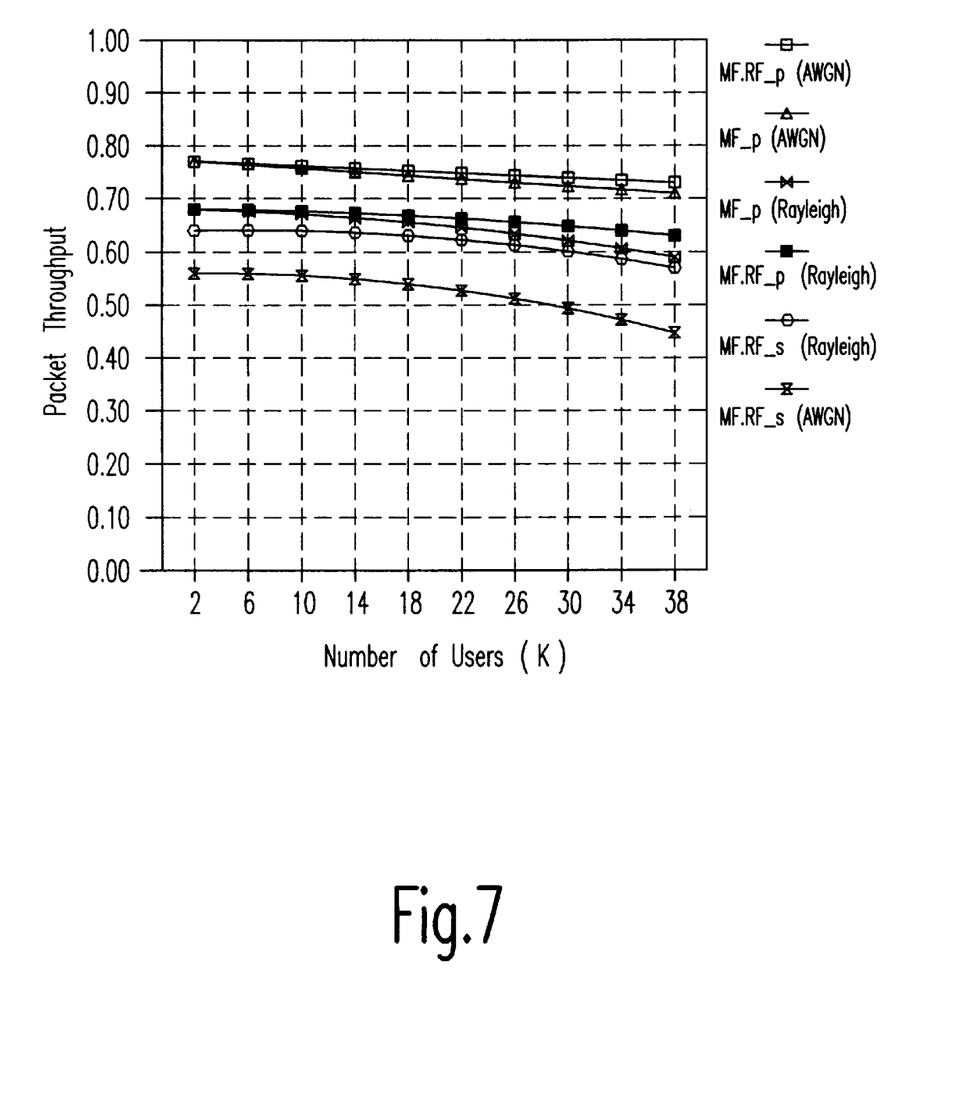
FIG. 7 is a graph depicting packet throughputs in different Rayleigh fading channels.

FIG. 7 is a graph which depicts packet throughputs in different Rayleigh fading channels. Such packet throughputs are associated with the case in which M=127, N=15, and an output signal-to-noise ratio is 15 dB.

For a performance analysis, it is assumed that the data packet length $L_d$ is 1,200 bits ($L_d$=1,200 bits), the phase adjustment parameter $\Delta$ is ½ ($\Delta$=½), and the receiver blocking probability $P_B$ is $10^5$ ($P_B=10^5$). The number of successful tests, N', for a majority decision in the coincidence detection mode is set to "(N-2)/2" (N'=[(n-2)/2]). The gain factor $\beta$ is selected so that the constant false alarm probability $P_{fa}$ is not more than $10^{-6}$ ($P_{fa} \leq 10^{-6}$). A decrease in the throughput caused by an increase in the number of users is remarkably exhibited in the additive white Gaussian noise, as compared to the Rayleigh fading channel.

Meanwhile, the present invention may also be applied to a synchronization system for reverse links of a code division multiple access system.

As apparent from the above description, the present invention provides a parallel acquisition system configured using a reference matched filter, thereby obtaining a superior acquisition performance and a high throughput as compared to conventional serial acquisition systems and conventional parallel acquisition systems including no reference matched filter. The parallel acquisition system of the present invention can also increase the throughput of a mobile radio data communication system utilizing a spread spectrum. Accordingly, an efficient communication service in mobile communication environments can be provided for an increased number of users per cell.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A parallel acquisition system comprising:
reference matched filter means connected in parallel to a plurality of detection matched filter means connected together in parallel, the reference matched filter means serving to estimate a dispersion of interference components of reception signals respectively input at the detection matched filter means;
the detection matched filter means adapted to receive a sequence identical to a transmitted pseudonoise sequence as a reception signal and to selectively output a maximum value of reception signals;
the reference matched filter means adapted to receive a sequence orthogonal to the transmitted pseudonoise sequence as a reception signal and to filter the received sequence, thereby removing a multiple access interference;
gain multiplying means adapted to calculate a gain factor and to multiply the calculated gain factor by an output from the reference matched filter means, the gain multiplying means outputting the result of the multiplication as a decision critical value;
comparing means adapted to compare an output from the detection matched filter means with the decision critical value output from the gain multiplying means and to generate an output only when the output from the detection matched filter means is higher than the decision critical value; and
decision means adapted to receive the output from the comparing means, thereby executing a coincidence detection mode operation for eliminating an unnecessary false alarm.

2. The parallel acquisition system in accordance with claim 1, wherein the decision means sends an output therefrom to a receiver of a spread spectrum system.

3. The parallel acquisition system in accordance with claim 1, wherein the decision means sends an output therefrom to a mobile radio data communication system.

4. A parallel acquisition system comprising:
a plurality of detection matched filter means connected each in parallel to selectively output a maximum value of reception signals;
means for removing an interference component of the reception signals and using a result therefrom for outputting a decision critical value; and
means for deciding a coincidence detection mode by comparing an output from the plurality of detection matched filter means with the decision critical value and for generating an output when the output from the detection matched filter means is higher than the decision critical value.

5. The parallel acquisition system of claim 4, wherein the plurality of detection matched filter means includes a plurality of detection matched filters adapted to receive a sequence identical to a transmitted pseudonoise sequence as a reception signal and to selectively output a maximum value of reception signals.

6. The parallel acquisition system of claim 5, wherein said means for removing an interference component and for outputting the decision critical value includes:

a reference matched filter adapted to receive a sequence orthogonal to the transmitted pseudonoise sequence as a reception signal and to filter the received sequence, thereby removing a multiple access interference; and a gain multiplier for calculating a gain factor and for multiplying the calculated gain factor by an output from the reference matched filter to generate the decision critical value.

7. The parallel acquisition system of claim 4, wherein said means for deciding a coincidence detection mode and for generating an output includes:

a comparator for comparing the output from the plurality of detection matched filter means with the decision critical value; and a decision unit for executing a coincidence detection mode operation only when the output from the plurality of detection matched filter means is higher than the decision critical value.

* * * * *